United States Patent [19]

Willis

[11] Patent Number: 4,683,557

[45] Date of Patent: Jul. 28, 1987

[54] ACOUSTIC LOGGING METHOD FOR IDENTIFYING SUBSURFACE FORMATION BOUNDARIES

[75] Inventor: Mark E. Willis, Carrollton, Tex.

[73] Assignee: Mobil Oil Corporation, New York, N.Y.

[21] Appl. No.: 657,906

[22] Filed: Oct. 5, 1984

[51] Int. Cl.$^4$ ............................................. G01V 1/40
[52] U.S. Cl. ...................... 367/57; 367/27; 367/31; 367/75; 181/102
[58] Field of Search .................. 367/27, 31, 361, 57, 367/58, 75, 34; 364/421; 181/102, 104

[56] References Cited

U.S. PATENT DOCUMENTS

| | | | |
|---|---|---|---|
| Re. 24,446 | 3/1958 | Summers | 181/0.5 |
| 2,021,943 | 11/1935 | McCollum | 367/57 |
| 3,333,238 | 7/1967 | Caldwell | 340/18 |
| 3,362,011 | 1/1968 | Zemanek, Jr. | 340/18 |
| 3,371,310 | 2/1968 | Silverman | 367/57 |
| 3,464,513 | 9/1969 | Raever | 181/104 |
| 3,474,878 | 10/1969 | Loren | 367/30 |
| 3,474,879 | 10/1969 | Adair | 181/104 |
| 4,131,875 | 12/1978 | Ingram | 367/35 |
| 4,328,567 | 5/1982 | Dodge | 367/75 |
| 4,383,308 | 5/1983 | Caldwell | 367/31 |
| 4,450,540 | 5/1984 | Mallett | 367/31 |
| 4,516,228 | 5/1985 | Zemanek | 367/25 |
| 4,562,557 | 12/1985 | Parks et al. | 367/27 |
| 4,575,828 | 3/1986 | Williams | 367/31 |
| 4,575,830 | 3/1986 | Ingram et al. | 367/75 |

FOREIGN PATENT DOCUMENTS 1152201 8/1983 Canada .

Primary Examiner—Nelson Moskowitz
Attorney, Agent, or Firm—Alexander J. McKillop; Michael G. Gilman; George W. Hager, Jr.

[57] ABSTRACT

A borehole logging tool includes at least one acoustic energy transmitter and at least one spaced apart acoustic energy receiver. Acoustic energy signals travel from the transmitter to the receiver directly through the subsurface formation adjacent the borehole and indirectly through reflections from subsurface formation changes below the bottom of the borehole. The difference in travel times of the directly arriving and indirectly arriving signals are determined for like acoustic waveforms as a measure of the depth of the subsurface reflecting formations below the borehole.

13 Claims, 3 Drawing Figures

ACOUSTIC LOGGING METHOD FOR IDENTIFYING SUBSURFACE FORMATION BOUNDARIES

BACKGROUND OF THE INVENTION

It has long been known to acoustically log open wellbores to determine the velocities of compression ("P") waves and shear ("S") waves traveling through rock formations located in the wellbore region. Logging devices have been used for this purpose which normally comprise a sound source (i.e., transmitter) and one or more receivers disposed at pre-selected distances from the sound sources. The use of remotely spaced, multiple receivers is intended to aid in distinguishing between various arriving wave fronts since travel time differentials increase with increasing distance from the transmitter, as described in U.S. Pat. No. 4,383,308 to R. C. Caldwell.

Such arriving wave fronts generally include both headwaves and guided waves. A first arriving event is the headwave commonly called a compressional wave which represents acoustic energy which has been refracted through the formation adjacent the wellbore. This compressional wave travels as a fluid pressure wave in the wellbore mud from the transmitter to the formation where it travels at the compressional wave velocity of the particular formation. The compressional wave then travels to the receiver through the wellbore mud as a fluid pressure wave.

A second arriving event is the headwave commonly called a shear wave which is also refracted through the formation adjacent the wellbore. Unlike the compressional wave, the shear wave travels at shear velocity through the formations. The particles of the formation along the path of propagation are vibrated in a direction perpendicular to the direction of the propagation of the wave.

A third arriving event is the guided wave commonly called a tube wave or Stoneley wave which causes a radial bulging and contraction of the borehole and its travel by way of path 22 is, therefore, associated with the borehole wall, that is, the boundary between the borehole fluids and the formation solids.

A fourth arriving event is the guided wave commonly called a normal mode, pseudo-Rayleigh wave, or reflected conical wave. The travel of this normal mode is restricted to the borehole and has an oscillatory pattern normal to its direction of travel. Normally, the shear wave is indistinguishable from the onset of this normal mode due to concurrent arrival times.

Various signal timing and wave front analysis methods have also been suggested for distinguishing between these various wave fronts received at a given receiver. Most of these methods involve timing circuits which anticipate the receipt of, and facilitate the collection of, such wave front information. For descriptions of various logging techniques for collecting and analyzing acoustic wave data, please refer to U.S. Pat. Nos. 3,333,238 (Caldwell); 3,362,011 (Zemanek, Jr.); Reissue No. 24,446 (Summers); and 4,383,308 (Caldwell).

In the design of such acoustic logging tools, various types of transmitters, such as piezoelectric or magnetostrictive transmitters, have been suggested for creating the acoustic logging signals. For conventional logging operations, most such transmitters have been centrally located in the borehole, and have been adapted to generate sound which is radiated in a multidirectional (360°) pattern from the transmitter to adjacent wellbore surfaces. Such transmitters are well suited for creating compression waves in surrounding rock and sand formations.

Recently, attention has been directed to developing transmitters which are particularly suited to shear wave logging. Such transmitters generally attempt to achieve a single point force application of sound energy to the borehole wall. The theory behind point force transmitters, as generally outlined in "A New Method of Shear-Wave Logging", *Geophysics*, Vol. 45, No. 10 (October 1980), pp. 1489-1506, by Choro Kitsunezaki, is that they are capable of directly generating shear waves. Conventional multidirectional transmitters are said to be capable only of indirectly creating shear waves. Point force type transmitters produce shear waves of substantially higher amplitudes than heretofore possible with conventional multidirectional compression wave transmitters. Accordingly, formations, such as loosely consolidated or unconsolidated sand, which do not propagate shear waves in sufficient amplitudes to permit definitive detection using conventional compression wave receivers, may now be shear wave logged with these shear wave logging systems. Canadian patent No. 1,152,201 to Angona and Zemanek, Jr. describes a shear wave acoustic logging system employing such a point force transmitter for the shear wave generation.

SUMMARY OF THE INVENTION

The present invention is directed to a method for identifying a subsurface formation boundary directly below a borehole.

Acoustic energy is generated at a first position within a borehole and received at a second position with the borehole located below the first position and near the bottom of the borehole. Like acoustic waveforms which have traveled (i) directly to the receiving position from the generating position through the formation adjacent the borehole, and (ii) indirectly to the receiving position from the generating position by way of reflection from a subsurface formation boundary directly below the bottom of the borehole are recorded. The difference in travel times of the like acoustic waveforms is determined. The depth of the subsurface formation boundary below the borehole is determined from the travel time difference and the velocity of acoustic energy through the formation.

In one aspect, the recorded like acoustic waveforms include compressional waves. In another aspect, the recorded like acoustic waveforms include shear waves. In a further aspect, the recorded like acoustic waveforms include the normal mode that has traveled directly to the receiving position and indirectly to the receiving position by way of conversion into shear waves at the bottom of the borehole and then by way of reflection from the subsurface formation boundary. In a yet further aspect, the recorded like acoustic waves include tube waves that have traveled directly to the receiving position and indirectly to the receiving position by way of conversion into compressional or shear waves at the bottom of the borehole and then by way of reflection from the subsurface formation boundary.

A first depth measurement may be provided from the travel time difference in the directly arriving and indirectly arriving compressional waves at the receiving position and the compressional wave velocity in the formation. A second depth measurement may be provided from the travel time difference in the directly arriving and indirectly arriving shear waves at the receiving position and the shear wave velocity in the formation. A third depth measurement may be provided from the travel time difference in a directly arriving tube wave and an indirectly arriving converted compressional wave at the receiving position and the compressional wave velocity in the formation. A fourth depth measurement may be provided from the travel time difference in a directly arriving tube wave and an indirectly arriving converted shear wave at the receiving position and the compressional wave velocity in the formation.

In a further aspect these four depth measurements may be combined to provide a single average depth measurement or may be selectively combined in pairs to provide the depth measurement. In one such paired combination, the first and third depth measurements are combined to produce an average depth measurement based upon compressional wave travel to the subsurface formation boundary. In another such paired combination the second and fourth depth measurements are combined to produce an average depth measurement based upon shear wave travel to the subsurface formation boundary.

DESCRIPTION OF THE PREFERRED EMBODIMENT

Figure 1:
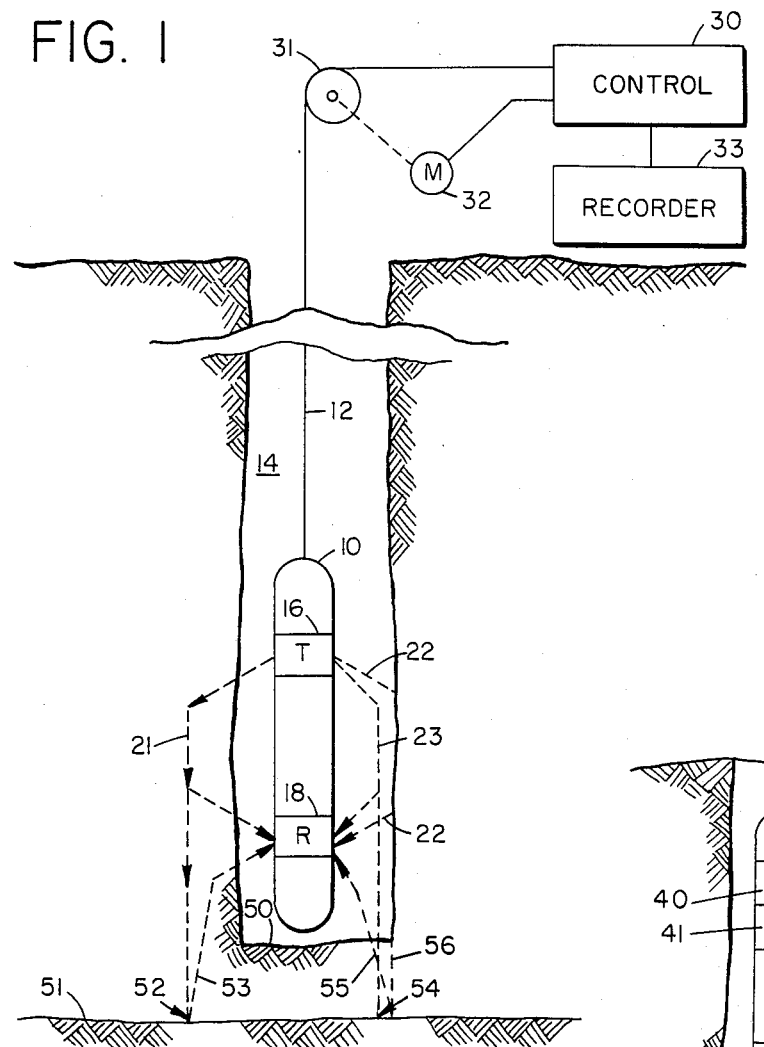
FIG. 1 is a diagrammatic representation of a well logging system employed to measure acoustic waves in formations adjacent and below a borehole.

The method of the present invention may be carried out by means of a conventional acoustic borehole logging system. The simplest acoustic logging system consists of a single transmitter and receiver as illustrated in FIG. 1. The logging tool 10 is suspended by cable 12 for movement along the length of the borehole 14. The logging tool includes an acoustic source or transmitter 16 for the production of repetitive time-spaced pulses of acoustic energy. An acoustic detector or receiver 18 detects the generated acoustic pulses after their travel through the surrounding formations and converts them into representative electrical signals. The uphole components include a surface control panel 30 to which the cable 12 is directed over the sheave 31. A motor 32, which is controlled from the surface control panel 30, operates the sheave 31 for raising and lowering the logging tool 10 in the borehole 14. An output means, such as a digital recorder 33, is electrically connected to the surface control panel for recording and/or displaying the data detected from the logging tool 10.

Figure 2:
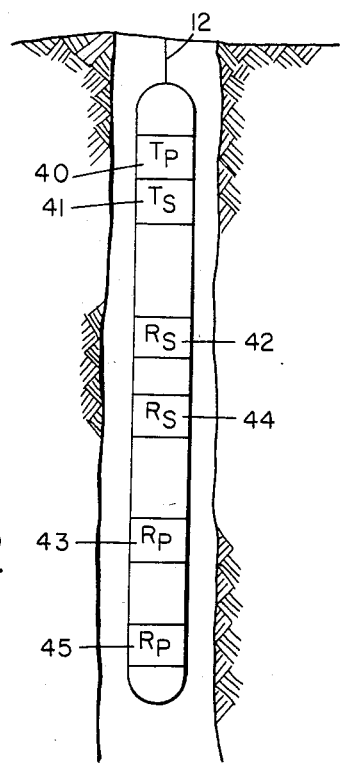
FIG. 2 is a diagrammatic illustration of an alternate embodiment of the well logging system of FIG. 1.

An alternate embodiment for the borehole logging tool 10 for use in carrying out the method of the present invention is shown in FIG. 2. Acoustic energies are generated from a multidirectional compression wave (P) transmitter 40 and a point force shear wave (S) transmitter 41. The multidirectional compression wave (P) transmitter 40 may be a piezoelectric or magnetostrictive transducer of the type known for producing suitably recordable compression waves. The shear wave (S) transmitter 41 may be of the type described in the aforementioned *Geophysics* article, "A New Method For Shear-Wave Logging," by Kitsunezaki or of the bender type point force described in the aforementioned Canadian patent.

Suspended below the transmitters 40 and 41 is at least one shear wave (S) receiver 42 and at least one compression wave (P) receiver 43. Receiver 42 is preferably of the aforementioned bender type transducer which is characterized by its high sensitivity to compression and tube waves. Receiver 43 is preferably of the piezoelectric or magnetostrictive type transducer which is characterized by its high sensitivity to compression waves and its low sensitivity to shear waves. In a preferred embodiment, shear wave receiver 42 is located about 4 to 6 feet below shear wave transmitter 41, and compression wave receiver 43 is located about 13 to 17 feet below compression wave transmitter 40. It should be noted that the use of separate receivers, as shown in FIG. 2, will result in separate waveform recordings as contrasted with the combined single waveform recording of FIG. 1. Additional shear and compressional receivers 44 and 45, respectively, may also be incorporated.

For more details and a more thorough understanding of the uphole recording of the acoustic waves detected by the borehole logging tool of FIGS. 1 and 2, reference may be made to the aforementioned U.S. Pat. Nos. 3,333,238 (Caldwell); 3,362,011 (Zemanek, Jr.); Reissue No. 24,446; and 4,383,308 (Caldwell).

Having set forth above alternate borehole logging systems of FIGS. 1 and 2, as well as in the above-referenced U.S. patents, the method of the present invention for use of acoustic wave recordings from such systems to identify subsurface formation boundaries below the bottom of the borehole will now be described. This method looks at acoustic reflections from a change in the formation below the bottom of a borehole.

The logging tool 10 of FIG. 1 is initially lowered to the vicinity of the bottom 50 of the borehole 14. The acoustic source or transmitter 16 is energized. Some of the generated acoustic energy will be received directly by the receiver 18 as compressional and shear waves by way of path 21 adjacent the borehole, as tube waves by way of path 22 along the borehole wall, and as the normal mode by way of path 23 within the borehole. Some of the generated acoustic energy, when reaching the bottom 50 of the borehole, will be reflected off the bottom and propagate upward to the receiver 18. Finally, the remaining acoustic energy continues on downward past the bottom 50 of the borehole until it is either reflected by or penetrates through a change in the formation directly below the borehole, as identified by the interface 51 of FIG. 1. When compressional or shear waves are reflected from interface 51, as illustrated at 52, the acoustic energy propagates upward toward the borehole by way of path 53, eventually entering the borehole and being detected by the receiver 18. When the normal mode is reflected from interface 51, as illustrated at 54, the acoustic energy is converted to a shear wave and propagates upward toward the borehole by way of path 55, eventually entering the borehole and being detected by the receiver 18. The tube wave cannot propagate outside the borehole. When this tube wave hits the bottom of the borehole, part of its energy is converted into compressional and shear energies. This converted tube wave energy then reflects from interface 51 as a compressional or shear wave propagates upward toward the borehole by way of path 56 and is subsequently detected by receiver 18 as compressional and shear waves. In a preferred mode of operation, the reflected waves received by the receiver 18 by way of paths 53, 55 and 56 recorded for a period of about 30 milliseconds from the energization of the transmitter 16 for a reflector 51 that is located within about 100 feet of the bottom of the borehole. This is greater than the recording time of about 10 milliseconds required for the recording of the directly arriving waves by way of paths 21, 22 and 23. The logging tool is slowly advanced up the borehole with such 30 millisecond recordings being made at frequent intervals of about every foot or so, for example.

Figure 3:
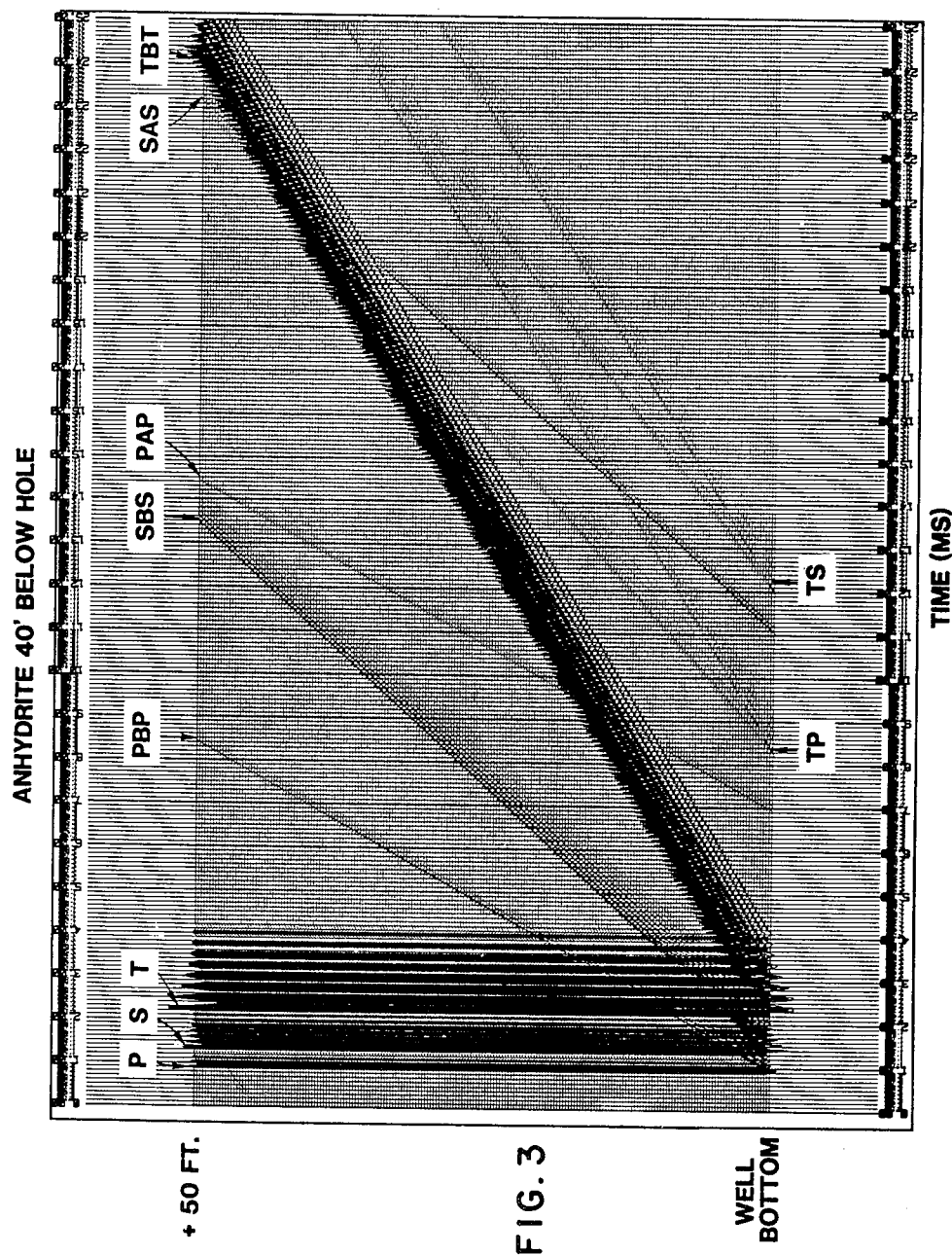
FIG. 3 illustrates a representative set of acoustic waveforms that might be received by the logging systems of FIGS. 1 and 2 while measuring acoustic waves in formations adjacent to and below a borehole.

FIG. 3 is representative of a set of acoustic waveforms that might be received by the receiver 18 as the logging tool is advanced upward a distance of 50 feet from the bottom of a borehole that penetrates a sandstone formation with an anhydrite layer about 40 feet below the bottom of the borehole. Compressional and tube waves are identified as P and T waves, respectively. Since the shear wave is indistinguishable from the onset of the normal mode due to concurrent arrival times at the receiver, both are identified together as S waves in FIG. 3 and will be hereinafter referred to collectively as S or SAS acoustic waves. In FIG. 3, the directly arriving compressional, shear and tube waves are identified as merely P, S and T, respectively. The reflections off the bottom of the borehole of the P, S and T waves are identified as PBP, SBS and TBT, respectively. The reflections of the P and S waves off the anhydrite layer, either direct or converted, are identified as PAP and SAS, respectively. That portion of this energy which represents the tube waves converted and reflected as compressional waves is identified as TP in FIG. 3. That portion of this energy which represents the tube waves converted and reflected as shear waves is identified as TS in FIG. 3.

After the recording of these acoustic waves, the distance from the bottom of the borehole to the reflecting anhydrite interface 51 is determined in accordance with the method of the present invention from the difference in the travel times of (i) the P and PAP acoustic waves, (ii) the S and SAS acoustic waves, (iii) the T and TP acoustic waves and (iv) the T and TS acoustic waves. Such travel times will depend on several factors: (i) the quality of the acoustic impedance contrast (i.e., reflection coefficient) of the lithology change, (ii) the acoustic sonde's source frequency (the lower the frequency the greater the distance), (iii) the condition of the borehole, and (iv) the seismic attenuation of the rock. Depending on such factors and with the use of a conventional logging sonde, formation changes in the order of up to 100 feet below the bottom of the borehole can be identified with the method of the present invention.

To identify such two-way travel time, the difference in the travel times of like acoustic waves is determined. The time difference between the compressional wave P and the compression wave PAP reflected from the formation boundary below the borehole is determined. The time difference between the shear wave S and shear wave SAS reflected from the formation boundary below the borehole is determined. The time difference between the tube wave T and the converted compressional wave TP resulting from its reflection from the formation boundary below the borehole is determined. Finally, the time difference between the tube wave T and the converted shear wave TS resulting from its reflection from the formation boundary below the borehole is determined. An estimate of the velocity of each of these acoustic waves may be obtained from compressional, shear and tube wave logs taken from other boreholes in the area. From these travel times and velocities, the distance to the reflecting formation boundary can be determined for each of the four pairs of like acoustic waves. These distances can be represented as follows:

$$D_1 = (PAP - P)(V_p), \quad (1)$$

$$D_2 = (SAS - S)(V_s), \quad (2)$$

$$D_3 = (TP - T)(V_p), \text{ and} \quad (3)$$

$$D_4 = (TS - T)(V_s). \quad (4)$$

where p1 $V_p$ = formation average velocity for a compressional wave, and $V_s$ = formation average velocity for a shear wave.

In a further aspect, these four distance determinations may be averaged in selective combinations, such as in pairs, in triplets, or all four together to yield a further determination of the distance from the bottom of the borehole to the reflecting formation change. For example, the depth measurements $D_1$ and $D_3$ may be combined to produce an average depth measurement based upon compressional wave travel to the subsurface formation boundary. Also, the depth measurements $D_2$ and $D_4$ may be combined to produce an average depth measurement based upon shear wave travel to the subsurface formation boundary. Still further, these depth measurements $D_1$, $D_2$, $D_3$ and $D_4$ may be combined in triplets or all four together to yield further depth determinations.

Having now described the method of the present invention, it is to be understood that various modifications and changes may be made without departing from the spirit and scope of the invention as set forth in the appended claims.

I claim:

1. A method for identifying a subsurface formation boundary below a borehole comprising the steps of:
   (a) generating acoustic energy at a first position along said borehole,
   (b) receiving acoustic energy at a second spaced apart position below said acoustic energy generating position and near the bottom of said borehole,
   (c) recording like acoustic waveforms which have traveled to said receiving position from said generating position (i) directly along a first path through borehole of the formation immediately adjacent the borehole, and (ii) indirectly along a second path that coincides with and extends said first path through the subsurface formation directly below said borehole by way of reflection from a subsurface formation boundary directly below the bottom of said borehole,
   (d) determining the difference in travel times of said recorded like acoustic waveforms, and
   (e) determining the depth of said subsurface formation boundary below said borehole from said travel time difference and the velocity of acoustic energy through said formation.

2. The method of claim 1 wherein said recorded like acoustic waveforms include compressional waves that have traveled directly to said receiving position from said generating position along said first path and indirectly to said receiving position along said second path by way of reflection from said subsurface formation boundary.

3. The method of claim 1 wherein said recorded like acoustic waveforms include shear waves that have traveled directly to said receiving position from said generating position along said first path and indirectly to said receiving position along said second path by way of reflection from said subsurface formation boundary.

4. The method of claim 1 wherein said recorded like acoustic waveforms include the normal mode that has traveled directly to said receiving position from said generating position along said first path and indirectly to said receiving position along said second path by way of conversion into shear wave energy at the bottom of said borehole and reflection of said converted shear wave energy from said subsurface formation boundary.

5. The method of claim 1 wherein said recorded like acoustic waveforms include tube waves that have traveled directly to said receiving position from said generating position along said first path and indirectly to said receiving position along said second path by way of conversion into compressional wave energy at the bottom of said borehole and reflection of said converted compressional wave energy from said subsurface formation boundary.

6. The method of claim 1 wherein said recorded like acoustic waveforms include tube waves that have traveled directly to said receiving position from said generating position along said first path and indirectly to said receiving position along said second path by way of conversion into shear wave energy at the bottom of said borehole and reflection of said converted shear wave energy from said subsurface formation boundary.

7. The method of claim 1 wherein said like acoustic waveforms are recorded for a period of at least 30 milliseconds at each of a plurality of depth points within said borehole.

8. The method of claim 1 wherein said like acoustic waveforms are recorded at a plurality of depth points within about 100 feet of the bottom of said borehole.

9. A method for identifying a subsurface formation boundary below a borehole, comprising the steps of:
(a) generating acoustic energy from at least one first position within said borehole,
(b) receiving acoustic energy from at least one second position within said borehole and located below the location of said at least one first position and adjacent the bottom of said borehole,
(c) simultaneously advancing said first and second positions upwardly within said borehole and recording said received acoustic energy for a plurality of incremental positions along said borehole,
(d) determining a first difference in travel times of acoustic energy that has (i) traveled downwardly directly from said first position along a first path through the subsurface formation immediately surrounding said borehole to said second position as a compressional wave, and (ii) traveled indirectly from said first position downwardly along a second path that coincides with and extends said first path through the subsurface formation directly below said borehole to a reflecting subsurface formation boundary directly below said borehole and then upwardly from said reflecting boundary as a compressional wave to said second position within said borehole,
(e) determining a second difference in travel times of acoustic energy that has (i) traveled downwardly directly from said first position along a third path through the subsurface formation immediately surrounding said borehole or through said borehole to said second position as a shear wave or as the normal mode respectively, and (ii) traveled indirectly from said first position downwardly along a fourth path that coincides with and extends said third path through the subsurface formation directly below said borehole as a shear wave or as the normal mode converted to a shear wave at the borehole bottom to a reflecting subsurface formation boundary directly below said borehole and then upwardly from said reflecting boundary as a shear wave or converted shear wave to said second position within said borehole,
(f) determining a third difference in travel times of acoustic energy that has (i) traveled downwardly directly from said first position along a fifth path through the borehole wall to said second position as a tube wave, and (ii) traveled downwardly indirectly from said first position along a sixth path that coincides with and extends said fifth path through the borehole wall to the bottom of the borehole as a tube wave where it is converted to a compressional wave and then through subsurface formation directly below said borehole by way of reflection from a subsurface formation boundary directly below said borehole as a converted compressional wave to said second position within said borehole,
(g) determining a fourth difference in travel times of acoustic energy that has (i) traveled downwardly directly from said first position along seventh path through the borehole wall to said second position as a tube wave, and (ii) traveled downwardly indirectly from said first position along an eighth path that coincides with and extends said seventh path through the borehole wall to the bottom of the borehole as a tube wave where it is converted to a shear wave and then through the subsurface formation directly below said borehole by way of reflection from a subsurface formation boundary directly below said borehole as a converted shear wave to said second position within said borehole,
(h) determining a first depth measurement of said subsurface formation boundary below said borehole from said first travel time difference and the velocity of a compressional wave through the subsurface formation above said boundary,
(i) determining a second depth measurement of said subsurface formation boundary below said borehole from said second travel time difference and the velocity of a shear wave through the subsurface formation above said boundary,
(j) determining a third depth measurement of said subsurface formation boundary below said borehole from said third travel time difference and the velocity of a compressional wave through the subsurface formation above said boundary, and
(k) determining a fourth depth measurement of said subsurface formation boundary below said borehole from said fourth travel time difference and the velocity of a shear wave through the subsurface formation above said boundary.

10. The method of claim 9 further comprising the step of combining said first, second, third and fourth depth measurements to provide a single average depth measurement.

11. The method of claim 9 further comprising the steps of combining at least one pair of said first, second, third and fourth depth measurements to provide for at least one average depth measurement.

12. The method of claim 9 wherein said first and third depth measurements are combined to produce an average depth measurement based upon compressional wave travel to said subsurface formation boundary.

13. The method of claim 9 wherein said second and fourth depth measurements are combined to produce an average depth measurement based upon shear wave travel to said subsurface formation boundary.

* * * * *